United States Patent [19]

Sierawski

[11] 4,122,246

[45] Oct. 24, 1978

[54] METHOD OF PREVENTING DISCOLORATION OF PLATINUM CONTAINING SILICONE GELS

[75] Inventor: David A. Sierawski, Midland, Mich.

[73] Assignee: Dow Corning Corporation, Midland, Mich.

[21] Appl. No.: 835,119

[22] Filed: Sep. 21, 1977

[51] Int. Cl.² ............................................. C08G 77/04
[52] U.S. Cl. ...................... 528/15; 260/825; 528/31; 528/32; 528/33
[58] Field of Search .......... 260/46.5 UA, 825, 46.5 G

[56] References Cited

U.S. PATENT DOCUMENTS

| 3,950,300 | 4/1976 | Hittmaier et al. | 260/46.5 UA |
| 4,033,924 | 7/1977 | Mine et al. | 260/46.5 UA |

*Primary Examiner*—Melvyn I. Marquis
*Attorney, Agent, or Firm*—Roger H. Borrousch

[57] ABSTRACT

Mixing vinyl-containing polyorganosiloxane, a silicon-bonded hydrogen containing organosilicon compound, a platinum catalyst, a polysiloxane having at least two silicon-bonded vinyl radicals and at least one silicon-bonded hydroxyl radical and an epoxy-containing, alkoxy silane provides a silicone gel which discolors less on aging than other platinum catalyzed silicone gels. An example of the polysiloxane is a hydroxyl endblocked polymethylvinylsiloxane and an example of the epoxy silane is

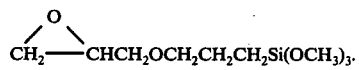

7 Claims, No Drawings

METHOD OF PREVENTING DISCOLORATION OF PLATINUM CONTAINING SILICONE GELS

BACKGROUND OF THE INVENTION

1. Field of the Invention

This invention relates to a method of making a silicone gel which discolors less on aging.

2. Description of the Prior Art

Silicone gels are known materials and many are known to be platinum catalyzed. One problem which arises in certain applications is discoloration on aging. The properties of the silicone gel are not altered by the discoloration except where aesthetic value is important or optical properties are required.

The use of vinyl containing polysiloxanes having silicon-bonded hydroxyl and epoxy silane for promoting adhesion of platinum cured compositions is known in the art from U.S. patent application Ser. No. 799,877, filed May 23, 1977 by Jay R. Schulz and entitled "Self-adhering Silicone Compositions and Preparation Thereof" now U.S. Pat. No. 4,087,585. The present invention is specific to silicone gels and to the method for making these gels. It has been found that some improvement is observed in using the combination as described by Schulz, but a significant improvement is obtained by mixing the vinyl containing polysiloxane having silicon-bonded hydroxyl and the epoxy silane separately to the vinyl-containing polyorganosiloxane before the remaining ingredients are added to make the silicone gel.

SUMMARY OF THE INVENTION

It has now been discovered that the method of preparing platinum catalyzed silicone gels with certain ingredients results in gels which exhibit less coloration on aging. It was completely unexpected that a vinylated polysiloxane and an epoxy silane could be used in making a silicone gel. Because silicone gels are low in the number of crosslinks per unit of gel, the addition of molecular species which could provide large numbers of crosslinks would be expected to provide either rubber type products or hard brittle resinous type products instead of gel products. The applicant has unexpectedly found that the method of mixing the ingredients and the type of ingredients results in both the production of a silicone gel with conventional gel properties while providing the advantage of providing a silicone gel which colors less on aging.

Separately combining the vinyl-containing polysiloxane and the epoxy silane with the vinyl-containing polyorganosiloxane before the remainder of the required ingredients are mixed to provide the silicone gel composition provides a cured silicone gel which exhibits reduced discoloration on aging.

DESCRIPTION OF THE INVENTION

This invention relates to a method for preventing discoloration of a silicone gel comprising mixing (A) vinyl-containing polyorganosiloxane having an average of about two silicon-bonded vinyl radicals per molecule, an average ratio of organo radicals per silicon atom within a range greater than 2 up to and including 2.03, and each organo radical of the polyorganosiloxane being a monovalent radical selected from the group consisting of hydrocarbon radicals and fluorinated alkyl radicals both having less than 7 carbon atoms per radical, (B) an organosilicon compound having an average of at least 3 silicon-bonded hydrogen atoms per organosilicon compound molecule and valences of any silicon atom in the organosilicon compound not satisfied by a hydrogen atom is satisfied by a divalent oxygen atom or an organo radical wherein each organo radical is a monovalent radical selected from the group consisting of hydrocarbon radicals and fluorinated alkyl radicals both having less than 7 carbon atoms per radical, the organosilicon compound having no more than one silicon-bonded hydrogen atom on any one silicon atom, (C) polysiloxane having at least one silicon-bonded hydroxyl radical per molecule and at least two silicon-bonded vinyl radicals per molecule, the polysiloxane having siloxane units bonded through silicon-oxygen-silicon bonds and valences of each silicon atom in the polysiloxane are satisfied by at least one of monovalent alkyl radical having less than 7 carbon atoms per radical, divalent oxygen, phenyl radical, vinyl radical and hydroxyl radical the polysiloxane having an average of less than 15 silicon atoms per molecule, (D) a silane having at least one epoxy-containing organo group, at least one silicon-bonded alkoxy group having less than 5 carbon atoms per group, and any remaining valences of the silane not satisifed by an epoxy-containing organo group or an alkoxy group is satisfied by a monovalent hydrocarbon radical or a fluorinated alkyl radical both having less than 7 carbon atoms per radical, and (E) a platinum catalyst, (A) and (B) being present in amounts sufficient to provide a mol ratio of silicon-bonded hydrogen atoms in (B) to silicon-bonded vinyl radical in (A) of less than one, the combined weight of (C) and (D) is less than 1.5 weight percent of the total composition, (C) being present in an amount of from 75 to 350 parts by weight per one part by weight of platinum and (D) being present in an amount of from 50 to 300 parts by weight per one part by weight platinum, said mixing of ingredients is such that (C) and (D) are separately combined with a part of (A) before the remainder of the ingredients are combined, after the ingredients are combined, the resulting composition cures to a silicone gel which has a penetration of from 2 to 60 millimeters. The penetration values for this invention are measured by a precision Universal penetrometer Catalog No. 73,510 of the Precision Scientific Company. Instead of using the standard cones supplied with the penetrometer, a brass head 6.350 mm in diameter and 4.762 mm high with a flat bottom and rounded edges is used. The total weight of the shaft and head is 19.5 g. For sample preparation, 100 g. of gel composition is placed in $2.3 \times 10^{-4}$ m$^3$ wide mouth jar and cured for 1 hour at 150° C.

The best method for preparing the silicone gels is to combine by mixing into (A), (C) and (D) separately. The order of mixing is not critical. For example, (C) may be added to (A) followed by the addition of (D), or (A) may be added to (C) followed by the addition of (D) or (D) may be added to (A) followed by the addition of (C). The additions are made with mixing and because (D) is sensitive to moisture, long exposure to moisture should be avoided and it is best to use essentially anhydrous conditions for the preparation as well as for storage. The platinum catalyst can be combined with (A) either before (C) and (D) are added or after (C) and (D) are added. Because of the smaller amounts of all of the other ingredients, it is advantageous to mix the other ingredients with (A) before combining all the ingredients to make the silicone gel. It is, therefore, preferable for convenience to divide (A) into equal weight amounts and use one half to combine with (C), (D) and (E) to make a first composition and the other half to combine with (B) to make a second composition. The silicone gel is then prepared by mixing the first and second compositions in equal amounts. The resulting silicone gel composition has a long pot life at room temperature, thus one preferably heats the composition to promote the curing reaction in a time period convenient for commercial operations, such as a few minutes. The resulting silicone gel shows less coloration upon either room temperature aging or heat aging than a composition which does not contain (C) and (D) or which is prepared by another method.

The ratio of the ingredients can be varied to give a range of gel properties. The softest gels, which are those having penetration values approaching 60 millimeters, are prepared from compositions which have the lower ratios of silicon-bonded hydrogen atoms to silicon-bonded vinyl radical. The compositions which cure to have penetration values greater than 60 millimeters are more fluid-like than gel-like. The harder gels, which are those having penetration values approaching two millimeters, are prepared from compositions which have the higher ratios of silicon-bonded hydrogen atoms to silicon-bonded vinyl radicals. The compositions which cure to have penetration values below two millimeters are too friable to be classified as gels.

The vinyl-containing polyorganosiloxane, (A), has an average of about two silicon-bonded vinyl radicals per molecule. The number of vinyl radicals can vary from two per molecule, for example, (A) can be a blend of two or more polyorganosiloxanes in which some molecules may have more vinyl radicals than two per molecule and some may have less than two vinyl radicals per molecule where the average would be about two vinyl radicals per molecule. Although it is not required that the silicon-bonded vinyl radicals be located in the alpha, omega positions of the polyorganosiloxane, it is preferred that at least some vinyl radicals be located in these positions, and preferably the vinyl radicals are located at the polymer ends because such polyorganosiloxanes are more economical to prepare and provide satisfactory products. However, because of the polymeric nature of (A), its preparation results in products which have some variations in structure and thus some vinyls may not be in the alpha, omega positions even if the intent is to have them in these positions. Thus, if small amounts of monoorganosiloxane units are present, the resulting polyorganosiloxane may have some vinyl radicals located at branch sites.

The polyorganosiloxanes of (A) are essentially linear polymers which can have some branching, however, the polymers have an average ratio of organo radicals per silicon atoms of from greater than 2 up to an including 2.03. The polyorganosiloxanes, therefore, have silicon-oxygen-silicon backbones with an average of greater than two organo groups per silicon atom. Preferably, (A) is made up of diorganosiloxane units with triorganosiloxane units for end groups, but small amounts of monoorganosiloxane units and $SiO_2$ units may also be present. The organo radicals having less than 7 carbon atoms per radical are each selected from monovalent hydrocarbon radicals such as methyl, ethyl, vinyl, propyl, hexyl and phenyl and monovalent fluorinated alkyl radicals, such as the perfluoroalkylethyl radicals including such species as 3,3,3-trifluoropropyl, β-(perfluoroethyl)ethyl and β-(perfluoropropyl)ethyl. Examples of (A) are dimethylvinylsiloxy endblocked polydimethylsiloxane, methylphenylvinylsiloxy endblocked polydimethylsiloxane, dimethylvinylsiloxy endblocked polymethyl-(3,3,3-trifluoropropyl)siloxane, dimethylvinylsiloxy endblocked polydiorganosiloxane copolymer of dimethylsiloxane units and methylphenylsiloxane units, and methylphenylvinylsiloxy endblocked polydiorganosiloxane copolymer of dimethylsiloxane units and diphenylsiloxane units. The polyorganosiloxane can have siloxane units such as dimethylsiloxane units, methylphenylsiloxane units, diphenylsiloxane units, methyl-(3,3,3-trifluoropropyl)siloxane units, methylethylsiloxane units, methylvinylsiloxane units, monomethylsiloxane units, monophenylsiloxane units, dimethylvinylsiloxane units, trimethylsiloxane units, methylphenylvinylsiloxane units, and $SiO_2$ units. Polyorganosiloxanes of (A) can be single polymers or mixtures of polymers. These polymers should have at least 50 percent of the organic radicals as methyl radicals. The polyorganosiloxanes of (A) are well known in the art. A preferred (A) is a polydimethylsiloxane endblocked with dimethylvinylsiloxy units or methylphenylvinylsiloxy units having a viscosity of 0.1 to 6 pascal-seconds at 25° C.

Organosilicon compound, (B), is a silicon compound containing at least 3 silicon-bonded hydrogen atoms per molecule. The silicon-bonded hydrogen atoms should each be on different silicon atoms. However, certain preparations may result in some small amount of silicon atoms with two silicon-bonded hydrogen atoms per silicon atom. These materials are not excluded from use in the present invention inasmuch as their removal from the other species could be prohibitively expensive and no detrimental effects are known from the use of such mixtures. For practical purposes, the organosilicon compounds are those which are designed to have one silicon-bonded hydrogen atom per silicon atom.

The organosilicon compound, (B), can be any siloxane having an average of at least three silicon-bonded hydrogen atoms per molecule and an average of no more than one silicon-bonded hydrogen atom per silicon atom. The remaining valences of the silicon atoms are satisfied by divalent oxygen atoms or by monovalent radicals of alkyl having one to six carbon atoms per radical, such as methyl, ethyl, propyl, isopropyl, butyl, tertiary butyl, pentyl, hexyl, cyclohexyl, or phenyl or 3,3,3-trifluoropropyl. The organohydrogensiloxanes can be homopolymers, copolymers and mixtures thereof which contain siloxane units of the following types:

$RSiO_{1.5}$, $R_2SiO$, $R_3SiO_{0.5}$, $RHSiO$, $HSiO_{1.5}$, $R_2HSiO_{0.5}$, $H_2SiO$, $RH_2SiO_{0.5}$ and $SiO_2$ where R is the monovalent radical defined above. Some specific examples include polymethylhydrogensiloxane cyclics, copolymers of trimethylsiloxy and methylhydrogensiloxane, copolymers of dimethylhydrogensiloxy and methylhydrogensiloxane, copolymers of trimethylsiloxy, dimethylsiloxane and methylhydrogensiloxane and copolymers of dimethylhydrogensiloxane, dimethylsiloxane and methylhydrogensiloxane. Preferably, the organohydrogensiloxanes are polymethylsiloxanes and have an average of at least five silicon-bonded hydrogen atoms per molecule. It is also preferred that (B) have less than 50 silicon atoms per molecule. Some additional species of organosilicon compounds, (B), can be found in U.S. Pat. No. 3,697,473 which is hereby incorporated to show species within the scope of (B) but is not intended to limit the scope of (B). U.S. Pat. No. 3,697,473 is also included by reference to show that in addition to species of (B) having at least 3 silicon-bonded hydrogen atoms, species which have 2 silicon-bonded hydrogen atoms can be combined with (B) for the attainment of specific properties. The preferred species which have 2 silicon-bonded hydrogen atoms per molecule are dimethylhydrogensiloxy endblocked polydimethylsiloxanes (F) which have a viscosity of less than 5 pascal-seconds at 25° C.

Ingredients (A) and (B) are present in the compositions of this invention in amounts sufficient to provide a mol ratio of silicon-bonded hydrogen atoms to silicon-bonded vinyl radicals of less than one, preferably less than 0.9. Preferably, the mol ratio of silicon-bonded hydrogen atoms to the silicon-bonded vinyl radicals is from 0.3 to 0.85 based on the total composition.

The platinum catalyst, (E), can be any of the compatible platinum catalysts known to catalyze the addition of silicon-bonded hydrogen atoms to silicon-bonded vinyl radicals. Platinum catalysts can be any of the known forms which are compatible such as, platinic chloride, salts of platinum, chloroplatinic acid and various complexes. Many of these platinum catalysts are described in U.S. Pat. No. 3,697,473 which is hereby incorporated to show platinum catalysts. One preferred class of platinum catalysts is described in U.S. Pat. No. 3,419,593 which is hereby incorporated by reference to show the preparation of this class of platinum catalysts and to show additional catalyst descriptions. Of the class of platinum catalysts described in U.S. Pat. No. 3,419,593, the most preferred is a reaction product of chloroplatinic acid and a vinylsiloxane having at least two dimethylvinylsiloxy units per molecule and any additional siloxane units being dimethylsiloxane. The platinum catalyst, (E), can be used in any catalytic quantity, such as in an amount sufficient to provide at least 0.1 part by weight platinum per one million parts by weight of (A), preferably at least one part by weight platinum per one million parts by weight (A) is used.

The polysiloxane, (C), is a siloxane having an average of less than 15 silicon atoms per molecule and containing at least one silicon-bonded hydroxyl radical per molecule and at least two silicon-bonded vinyl radicals per molecule. The valences of each silicon atom in (C) are satisfied by at least one of a monovalent alkyl radical having less than 7 carbon atoms per radical, other than vinyl, phenyl radical, vinyl radical and hydroxyl radical with the remaining valences being satisfied by divalent oxygen atoms. (C) can have siloxane units, such as, R'SiO$_{1.5}$, R'$_2$SiO, R'$_3$SiO$_{0.5}$, CH$_2$=CHSiO$_{1.5}$, C$_6$H$_5$SiO$_{1.5}$, HOSiO$_{1.5}$, R'(CH$_2$=CH)SiO, R'(HO)SiO$_{1.5}$, R'(C$_6$H$_5$)SiO, (C$_6$H$_5$)$_2$SiO, (C$_6$H$_5$)(CH$_2$=CH)SiO, (C$_6$H$_5$)(HO)SiO, (CH$_2$=CH)(HO)SiO, (HO)R'$_2$SiO$_{0.5}$, (CH$_2$=CH)R'$_2$SiO$_{0.5}$, (HO)(CH$_2$=CH)R'SiO$_{0.5}$ and (HO)(C$_6$H$_5$)R'SiO$_{0.5}$ where R' is a monovalent alkyl radical of less than 7 carbon atoms per radical, such as methyl, ethyl, propyl, hexyl and cyclohexyl. Preferably, (C) is a polysiloxane having hydroxyl siloxane units as end groups and the other siloxane units as diorganosiloxane units, where the preferred diorganosiloxane units are methylvinylsiloxane units and dimethylsiloxane units. (C) can be a mixture of one or more siloxane species. Some preferred species include hydroxyl endblocked polymethylvinylsiloxanes and hydroxyl endblocked polydiorganosiloxane copolymers of dimethylsiloxane units and methylvinylsiloxane units. Preferably, (C) has from 3 to 15 siloxane units.

The silane (D) is a molecule containing one silicon atom per molecule which has bonded thereto at least one epoxy-containing organo group, at least one silicon-bonded alkoxy group, and any remaining valences are monovalent hydrocarbon radicals or monovalent fluorinated alkyl radicals. The alkoxy groups on (D) have less than 5 carbon atoms per group and are illustrated by methoxy, ethoxy, propoxy and butoxy. Both the monovalent hydrocarbon radicals and the fluorinated alkyl radicals have less than 7 carbon atoms per radical and are illustrated above in the description of (A). For the purpose of this invention "epoxy" refers to the structural group

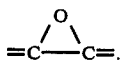

Many silanes of this type are known and are described in U.S. Pat. No. 3,455,877 which is hereby incorporated by reference to show the alkoxylated epoxy silanes and their preparation. The silanes of (D) are preferably mono(epoxyorgano)trialkoxysilanes in which the epoxyorgano group is a radical of the formulae

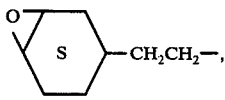

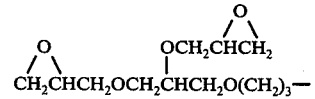

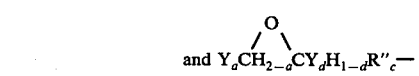

and $Y_aCH_{2-a}CY_dH_{1-d}R''_c$— in which each Y is an alkyl radical of 1 or 2 carbon atoms, a is 0, 1 or 2, c and d are each 0 or 1 and R" is a divalent hydrocarbon radical of no more than 12 carbon atoms and is either a saturated aliphatic hydrocarbon radical or an arylene radical, or divalent radicals of the formula

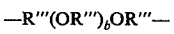

in which any two oxygen atoms are separated by at least two carbon atoms, R''' is a divalent saturated aliphatic hydrocarbon radical of 2 to 6 carbon atoms per radical and b is 0 to 8. The preferred (D) is a silane of the formula

The amounts of (C) and (D) present in the silicone gel composition for the method of this invention are dependent upon the amount of platinum present. (C) is present in an amount of from 75 to 350 parts by weight per one part by weight of platinum, preferably from 90 to 320. (D) is present in an amount of from 50 to 300 parts by weight per one part by weight of platinum, preferably from 80 to 275. These ranges permit the resulting compositions prepared by the method of this invention to cure to silicone gels and also reduce the discoloration on aging.

The resulting silicone gels are useful as potting materials and encapsulating materials. The silicone gels also find application in the medical field as used in breast prostheses and in the manufacture of equipment utilizing solar energy, such as collectors.

The following example is presented for illustrative purposes and should not be construed as limiting the scope of the present invention which is properly delineated in the claims. All parts in the following examples are parts by weight unless otherwise specifically stated.

EXAMPLE (A) A first mixture was prepared by rolling a container containing 99.6 parts of a methylphenylvinylsiloxy endblocked polydimethylsiloxane (Polymer A) having a viscosity at 25° C. in the range of 0.3 to 0.5 Pa·s and an average ratio of organic radicals per silicon atom in the range of 2.012 to 2.016, and 0.4 part of a chloroplatinic acid complex of divinyltetramethyldisiloxane diluted with Polymer A to provide 0.63 weight percent platinum. A second mixture was prepared by rolling a container containing 97.65 parts of Polymer A and 2.35 parts of a trimethylsiloxy endblocked polyorganosiloxane (polymer B) having siloxane units of 37.5 mol percent dimethylsiloxane units and 62.5 mol percent methylhydrogensiloxane units where the mol percent is exclusive of the trimethylsiloxy units and a silicon-bonded hydrogen content in the range of about 0.7 to 0.8 weight percent.

(B) A first mixture was prepared as described in (A) by combining 99.31 parts of Polymer A, 0.41 part of the platinum complex and 0.28 part of a hydroxy endblocked polymethylvinylsiloxane (Polymer C) having a viscosity at 25° C. in the range of 0.02 to 0.05 Pa·s, a silicon-bonded hydroxyl content of 3.0 to 4.5 weight and an average of 8 to 13 methylvinylsiloxane units per molecule. A second mixture was prepared as described in (A) by combining 97.08 parts of Polymer A and 2.92 parts of Polymer B.

(C) A first mixture was prepared as described in (A) by combining 99.35 parts of Polymer A, 0.41 part of the platinum complex and 0.24 part of a silane of the formula

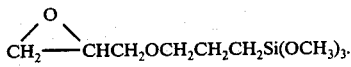

A second mixture was prepared as described in (A) by combining 97.65 parts of Polymer A and 2.35 parts of Polymer B.

(D) A first mixture was prepared as described in (A) by combining 99.08 parts of Polymer A and 0.41 part of the platinum complex, thereafter 0.27 part of Polymer C was added and the container rolled and finally 0.24 part of the silane defined in (C) was added. A second mixture was prepared as described in (A) by combining 97.08 parts of Polymer A and 2.92 parts of Polymer B.

The first and second mixtures of (A), (B), (C) and (D) were thoroughly mixed in equal weight amounts to form gel compositions. A sample of gel composition was heated at 135° C. to determine a gel time. A sample of each gel composition was cured by heating at 150° C. The cured gel was maintained at 150° C. while observing the color changes. Gel (A) was used as the control and contained no additives. Gels (B) and (C) were used as comparisons to determine if both additives were required. Gel (D) was a gel of this invention.

Gel (A) had a 135° C. gel time of 7.8 minutes and became dark brown in one hour.

Gel (B) had a 135° C. gel time of 11.2 minutes and became yellow in four days.

Gel (C) became yellow and in 2 weeks was brown but not as dark as gel (A).

Gel (D) showed some color change after 4 days but was only light yellow after two weeks. Gel (D) had a 135° C. gel time of 11.0 minutes.

A gel was prepared as described for (D) except Polymer C and the defined silane were mixed one week prior to the addition to the other ingredients. The gel became cloudy.

That which is claimed is:

1. A method for preventing discoloration of a silicone gel comprising mixing
    (A) vinyl-containing polyorganosiloxane having an average of about two silicon-bonded vinyl radicals per molecule, an average ratio of organo radicals per silicon atom within a range greater than 2 up to and including 2.03, and each organo radical of the polyorganosiloxane being a monovalent radical selected from the group consisting of hydrocarbon radicals and fluorinated alkyl radicals both having less than 7 carbon atoms per radical,
    (B) an organosilicon compound having an average of at least 3 silicon-bonded hydrogen atoms per organosilicon compound molecule and valences of any silicon atom in the organosilicon compound not satisfied by a hydrogen atom is satisfied by a divalent oxygen atom or an organo radical wherein each organo radical is a monovalent radical selected from the group consisting of hydrocarbon radicals and fluorinated alkyl radicals both having less than 7 carbon atoms per radical, the organosilicon compound having no more than one silicon-bonded hydrogen atom on any one silicon atom,
    (C) polysiloxane having at least one silicon-bonded hydroxyl radical per molecule and at least two silicon-bonded vinyl radicals per molecule, the polysiloxane having siloxane units bonded through silicon-oxygen-silicon bonds and valences of each silicon atom in the polysiloxane are satisfied by at least one of monovalent alkyl radical having less than 7 carbon atoms per radical, divalent oxygen, phenyl radical, vinyl radical and hydroxyl radical, the polysiloxane having an average of less than 15 silicon atoms per molecule,
    (D) a silane having at least one epoxy-containing organo group, at least one silicon-bonded alkoxy group having less than 5 carbon atoms per group, and any remaining valences of the silane not satisfied by an epoxy-containing organo group or an alkoxy group is satisfied by a monovalent hydrocarbon radical or a fluorinated alkyl radical both having less than 7 carbon atoms per radical, and
    (E) a platinum catalyst,
    (A) and (B) being present in amounts sufficient to provide a mol ratio of silicon-bonded hydrogen atoms in (B) to silicon-bonded vinyl radical in (A) of less than one, the combined weight of (C) and (D) is less than 1.5 weight percent of the total composition, (C) being present in an amount of from 75 to 350 parts by weight per one part by weight of platinum and (D) being present in an amount of from 50 to 300 parts by weight per one part by weight platinum, said mixing of ingredients is such that (C) and (D) are separately combined with a part of (A) before the remainder of the ingredients are combined, after the ingredients are combined, the resulting composition cures to a silicone gel which has a penetration of from 2 to 60 millimeters.

2. The method in accordance with claim 1 in which (A) is a diorganovinylsiloxy endblocked polydimethylsiloxane having a viscosity of 0.1 to 6 pascal·seconds at 25° C. and each organo group of the diorganovinylsiloxy is methyl or phenyl, (B) is a polymethylsiloxane having an average of at least three silicon-bonded hydrogen atoms per molecule present in an amount to provide a ratio of silicon-bonded hydrogen atoms to vinyl in the total composition of from 0.3 to 0.85, (C) is a hydroxyl endblocked polymethylvinylsiloxane having an average of 2 to 15 silicon atoms per molecule, (D) is a silane of the formula

(E) is a catalytic amount of a compatible platinum catalyst.

3. The method in accordance with claim 2 in which a first composition of (C), (D), (E) and a part of (A) are combined and thereafter a second composition of (B) and the remainder of (A) is mixed with the first composition to produce a silicone gel.

4. The method in accordance with claim 2 in which there is also present (F) a dimethylhydrogensiloxy endblocked polydimethylsiloxane having a viscosity of less than 5 pascal·seconds at 25° C.

5. The method in accordance with claim 3 in which a first composition of (C), (D), (E) and a part of (A) are combined and thereafter a second composition of (B), the remainder of (A), and (F) a dimethylhydrogensiloxy endblocked polydimethylsiloxane having a viscosity of less than 5 pascal·seconds at 25° C. is mixed with the first composition to produce a silicone gel.

6. The method in accordance with claim 3 in which (A) is divided equally between the first and second compositions.

7. The method in accordance with claim 5 in which (A) is divided equally between the first and second compositions.

* * * * *